United States Patent
Allen

(10) Patent No.: US 12,404,014 B2
(45) Date of Patent: Sep. 2, 2025

(54) HYDRAULIC MOTOR START ASSIST

(71) Applicant: GOODRICH CORPORATION, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 266 days.

(21) Appl. No.: 18/187,416

(22) Filed: Mar. 21, 2023

(65) Prior Publication Data

US 2024/0317390 A1 Sep. 26, 2024

(51) Int. Cl.
*B64C 25/50* (2006.01)
*B64C 25/22* (2006.01)

(52) U.S. Cl.
CPC .............. *B64C 25/50* (2013.01); *B64C 25/22* (2013.01)

(58) Field of Classification Search
None
See application file for complete search history.

(56) References Cited

U.S. PATENT DOCUMENTS

| | | | | |
|---|---|---|---|---|
| 2,001,620 A * | 5/1935 | Lucien | ................... | B64C 25/22 244/102 R |
| 2,267,284 A * | 12/1941 | Livers | ................... | F15B 13/021 60/904 |
| 2,363,235 A * | 11/1944 | Ellinwood | .............. | B64C 25/22 137/637.1 |
| 2,484,603 A * | 10/1949 | Audemar | ................ | B64C 25/22 416/157 R |
| 4,190,130 A * | 2/1980 | Beck | ........................ | B62D 5/32 180/406 |
| 4,422,290 A * | 12/1983 | Huffman | ................. | F15B 11/17 60/404 |
| 4,574,904 A * | 3/1986 | Goode | ...................... | B62D 5/32 60/404 |
| 4,694,649 A | 9/1987 | Howeth | | |
| 6,345,501 B1 * | 2/2002 | McKay | ................... | F15B 21/14 60/494 |
| 6,792,844 B1 * | 9/2004 | Gedge | ................... | F15B 13/021 251/63.4 |
| 8,393,565 B2 * | 3/2013 | Frank | ..................... | B64C 25/22 244/50 |
| 9,422,052 B2 * | 8/2016 | Kondo | ................... | B64C 13/504 |
| 10,196,131 B2 | 2/2019 | McCormick et al. | | |
| 10,464,663 B2 * | 11/2019 | Luce | ....................... | B64C 25/50 |
| 10,794,370 B2 * | 10/2020 | Abaitancei | .............. | B60K 6/12 |
| 10,851,815 B2 * | 12/2020 | Frank | ..................... | B64C 25/30 |
| 10,919,620 B2 * | 2/2021 | Didey | ..................... | B64C 25/34 |
| 11,180,244 B2 * | 11/2021 | Evans | ..................... | F15B 15/06 |
| 11,260,961 B2 * | 3/2022 | Howell | ................... | B64C 25/42 |
| 11,820,495 B2 * | 11/2023 | Kerr | ....................... | B64C 25/30 |

(Continued)

OTHER PUBLICATIONS

European Patent Office, European Search Report dated Aug. 21, 2024 in Application No. 24164725.4.

*Primary Examiner* — Umashankar Venkatesan
(74) *Attorney, Agent, or Firm* — SNELL & WILMER L.L.P.

(57) ABSTRACT

A nose-wheel steering system is provided. The nose-wheel steering system includes a hydraulic motor including a drive shaft configured to rotate about a first axis; and a hydraulic motor start assist mechanism coupled to the hydraulic motor and configured to provide a temporary boost of hydraulic fluid pressure supplied to the hydraulic motor.

17 Claims, 7 Drawing Sheets

(56) References Cited

U.S. PATENT DOCUMENTS

| | | |
|---|---|---|
| 2003/0188529 A1 | 10/2003 | Collet et al. |
| 2005/0082427 A1* | 4/2005 | Seung ............... B64C 25/50 |
| | | 244/102 R |
| 2006/0144993 A1 | 7/2006 | Hsu et al. |
| 2010/0301170 A1* | 12/2010 | Boseroy ............ G05B 11/42 |
| | | 244/194 |
| 2019/0120258 A1 | 4/2019 | Zavadinka |
| 2022/0281591 A1 | 9/2022 | Allen |
| 2024/0317390 A1* | 9/2024 | Allen ............... B64C 25/50 |

* cited by examiner

HYDRAULIC MOTOR START ASSIST

FIELD

The present disclosure relates generally to aircraft steering systems and, more particularly, to a hydraulic motor start assist for aircraft nose-wheel steering systems.

BACKGROUND

Aircraft typically employ nose-wheel steering systems to steer the aircraft while taxiing on the ground. A typical nose-wheel steering system includes a collar gear provided upon a strut associated with the nose-wheel. Various actuators and gear trains may be associated with rotating the collar gear, and hence the strut, thereby adjusting the orientation of the nose-wheel to affect steering (i.e., the direction of the taxiing aircraft). Hydraulic motor sizing plays a large role in the weight of a rotary actuator. While nominal running torque efficiencies of 90-95% are typical of a hydraulic motor, the minimum starting torque efficiency may be as low as roughly 65-70%. Therefore, since actuator motor torque load may be at maximum at start, the motor is typically oversized to compensate for this lower starting torque efficiency, leading to more weight and package volume.

SUMMARY

Disclosed herein is a nose-wheel steering system. The nose-wheel steering system includes a hydraulic motor including a drive shaft configured to rotate about a first axis; and a hydraulic motor start assist mechanism coupled to the hydraulic motor and configured to provide a temporary boost of hydraulic fluid pressure supplied to the hydraulic motor.

In various embodiments, the hydraulic motor start assist mechanism includes a servo valve coupled to the hydraulic motor and an intensifier valve, the servo valve configured to provide the hydraulic fluid pressure to the hydraulic motor and the intensifier valve; the intensifier valve coupled to a displacement intensifier and configured to provide the hydraulic fluid pressure to the servo valve in a first state and provide the hydraulic fluid pressure to the displacement intensifier in a second state; and the displacement intensifier configured to translate in a first direction in the first state and translate in a second direction in the second state.

In various embodiments, responsive to receiving a first command from a pilot steering input, the servo valve switches from a flow-blocking position to a cross-flow position. In various embodiments, in the cross-flow position, the servo valve provides pressurized hydraulic fluid to a first port on the hydraulic motor. In various embodiments, responsive to the first command being discontinued, the servo valve switches from the cross-flow position to the flow-blocking position. In various embodiments, responsive to the hydraulic fluid pressure at the first port on the hydraulic motor failing to overcome a starting torque of the hydraulic motor, a rise in hydraulic fluid pressure causes the intensifier valve to switch from a straight-flow position to a displacement-flow position providing the pressurized hydraulic fluid to a head end of the displacement intensifier thereby causing the hydraulic fluid pressure at the first port on the hydraulic motor to increase to overcome the starting torque of the hydraulic motor. In various embodiments, an area ratio between the head end of the displacement intensifier and a back end of the displacement intensifier provides for the increase in the hydraulic fluid pressure at the first port on the hydraulic motor when an area at the head end of the displacement intensifier is greater than an area at the back end of the displacement intensifier. In various embodiments, the increase in the hydraulic fluid pressure provided by the displacement intensifier is caused by the area at the head end the displacement intensifier being greater than an area at a tail end of the displacement intensifier thereby allowing a piston in the displacement intensifier to translate in the first direction and cause the hydraulic fluid pressure at a back end of the displacement intensifier to increase in pressure.

In various embodiments, responsive to receiving a second command from a pilot steering input, the servo valve switches from a flow-blocking position to a straight-flow position. In various embodiments, in the straight-flow position, the servo valve provides pressurized hydraulic fluid to a second port on the hydraulic motor. In various embodiments, responsive to the second command being discontinued, the servo valve switches from the straight-flow position to the flow-blocking position. In various embodiments, responsive to the hydraulic fluid pressure at the second port on the hydraulic motor failing to overcome a starting torque of the hydraulic motor, a rise in the hydraulic fluid pressure causes the intensifier valve to switch from a straight-flow position to a displacement-flow position providing the pressurized hydraulic fluid to a head end of the displacement intensifier thereby causing the hydraulic fluid pressure at the second port on the hydraulic motor to increase to overcome the starting torque of the hydraulic motor. In various embodiments, an area ratio between the head end of the displacement intensifier and a back end of the displacement intensifier provides for the increase in the hydraulic fluid pressure at the first port on the hydraulic motor when an area at the head end of the displacement intensifier is greater than an area at the back end of the displacement intensifier. In various embodiments, the increase in the hydraulic fluid pressure provided by the displacement intensifier is caused by at the area at the head end of the displacement intensifier being greater than an area at a tail end of the displacement intensifier thereby allowing a piston in the displacement intensifier to translate in the first direction and cause the hydraulic fluid pressure at a back end of the displacement intensifier to increase in pressure.

Also disclosed herein is a nose landing gear assembly. The nose landing gear assembly includes a shock strut assembly including a strut cylinder and a strut piston configured to telescope relative to the strut cylinder; and a nose-wheel steering system coupled to the shock strut assembly and configured to rotate the strut piston about a piston axis of rotation. The nose-wheel steering system including a hydraulic motor including a drive shaft configured to rotate about a second axis, the second axis being parallel to the piston axis of rotation; and a hydraulic motor start assist mechanism coupled to the hydraulic motor and configured to provide a temporary boost of hydraulic fluid pressure supplied to the hydraulic motor.

In various embodiments, the hydraulic motor start assist mechanism includes a servo valve coupled to the hydraulic motor and an intensifier valve, the servo valve configured to provide the hydraulic fluid pressure to the hydraulic motor and the intensifier valve; the intensifier valve coupled to a displacement intensifier and configured to provide the hydraulic fluid pressure to the servo valve in a first state and provide the hydraulic fluid pressure to the displacement intensifier in a second state; and the displacement intensifier configured to translate in a first direction in the first state and translate in a second direction in the second state.

In various embodiments, responsive to receiving a first command from a pilot steering input, the servo valve switches from a flow-blocking position to a cross-flow position. In various embodiments, in the cross-flow position, the servo valve provides pressurized hydraulic fluid to a first port on the hydraulic motor. In various embodiments, responsive to the first command being discontinued, the servo valve switches from the cross-flow position to the flow-blocking position. In various embodiments, responsive to the hydraulic fluid pressure at the first port on the hydraulic motor failing to overcome a starting torque of the hydraulic motor, the hydraulic fluid pressure causes the intensifier valve to switch from a straight-flow position to a displacement-flow position providing the pressurized hydraulic fluid to a head end of the displacement intensifier thereby causing the hydraulic fluid pressure at the first port on the hydraulic motor to increase to overcome the starting torque of the hydraulic motor. In various embodiments, an area ratio between the head end of the displacement intensifier and a back end of the displacement intensifier provides for the increase in the hydraulic fluid pressure at the first port on the hydraulic motor when an area at the head end of the displacement intensifier is greater than an area at the back end of the displacement intensifier. In various embodiments, the increase in the hydraulic fluid pressure provided by the displacement intensifier is caused by the area at the head end of the displacement intensifier being greater than an area at a tail end of the displacement intensifier thereby allowing a piston in the displacement intensifier to translate in the first direction and cause the hydraulic fluid pressure at the back end of the displacement intensifier to increase in pressure.

In various embodiments, responsive to receiving a second command from a pilot steering input, the servo valve switches from a flow-blocking position to a straight-flow position. In various embodiments, in the straight-flow position, the servo valve provides pressurized hydraulic fluid to a second port on the hydraulic motor. In various embodiments, responsive to the second command being discontinued, the servo valve switches from the straight-flow position to the flow-blocking position. In various embodiments, responsive to the hydraulic fluid pressure at the second port on the hydraulic motor failing to overcome a starting torque of the hydraulic motor, the hydraulic fluid pressure causes the intensifier valve to switch from a straight-flow position to a displacement-flow position providing the pressurized hydraulic fluid to a head end of the displacement intensifier thereby causing the hydraulic fluid pressure at the second port on the hydraulic motor to increase to overcome the starting torque of the hydraulic motor. In various embodiments, an area ratio between the head end of the displacement intensifier and a back end of the displacement intensifier provides for the increase in the hydraulic fluid pressure at the second port on the hydraulic motor when an area at the head end of the displacement intensifier is greater than an area at the back end of the displacement intensifier. In various embodiments, the increase in the hydraulic fluid pressure provided by the displacement intensifier is caused by the area at the head end of the displacement intensifier being greater than an area at a tail end of the displacement intensifier thereby allowing a piston in the displacement intensifier to translate in the first direction and cause the hydraulic fluid pressure at the back end of the displacement intensifier to increase in pressure.

Also disclosed herein is a shock strut assembly for an aircraft landing gear assembly. The aircraft landing gear assembly includes a strut cylinder; a strut piston configured to telescope relative to the strut cylinder; and a steering system coupled to the strut piston and configured to rotate the strut piston about a piston axis of rotation. The steering system includes a hydraulic motor including a drive shaft configured to rotate about a second axis, the second axis being parallel to the piston axis of rotation; and a hydraulic motor start assist mechanism coupled to the hydraulic motor and configured to provide a temporary boost of hydraulic fluid pressure supplied to the hydraulic motor.

In various embodiments, the hydraulic motor start assist mechanism includes a servo valve coupled to the hydraulic motor and an intensifier valve, the servo valve configured to provide the hydraulic fluid pressure to the hydraulic motor and the intensifier valve; the intensifier valve coupled to a displacement intensifier and configured to provide the hydraulic fluid pressure to the servo valve in a first state and provide the hydraulic fluid pressure to the displacement intensifier in a second state; and the displacement intensifier configured to translate in a first direction in the first state and translate in a second direction in the second state.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is a hydraulic motor start assist mechanism. In various embodiments, the hydraulic motor start assist mechanism utilizes an integral intensifier and intensifier valve to temporarily boost hydraulic fluid pressure supplied to a bi-directional hydraulic motor, therefore increasing motor torque output by roughly 30% to compensate for the lower starting torque efficiency. In various embodiments, the bi-directional hydraulic motor may be sized approximately 20-30% smaller compared to what the bi-directional hydraulic motor would normally be sized at without the hydraulic motor start assist mechanism. In various embodiments, the bi-directional hydraulic motor weight savings of approximately 25% is reduced to approximately 15-20% by the added weight of the integral intensifier and intensifier valve of the hydraulic motor start assist mechanism.

Figure 1:
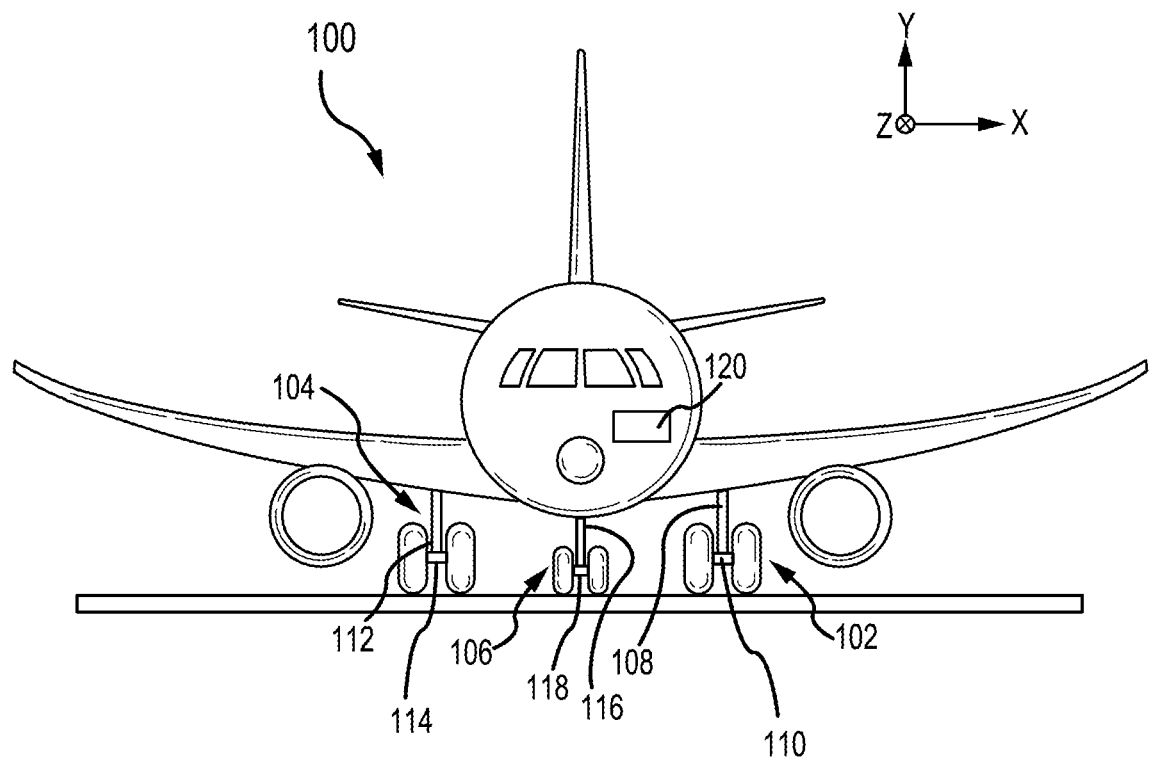
FIG. 1 illustrates an aircraft having left, right and nose landing gear assemblies and wheels mounted thereon, in accordance with various embodiments.

With reference to FIG. 1, an aircraft 100 is illustrated. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support the aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118. One or more pilot steering input(s) 120 (e.g., steering wheels, pedals, knobs, or the like) may be located in a cockpit of aircraft 100.

Figure 2:
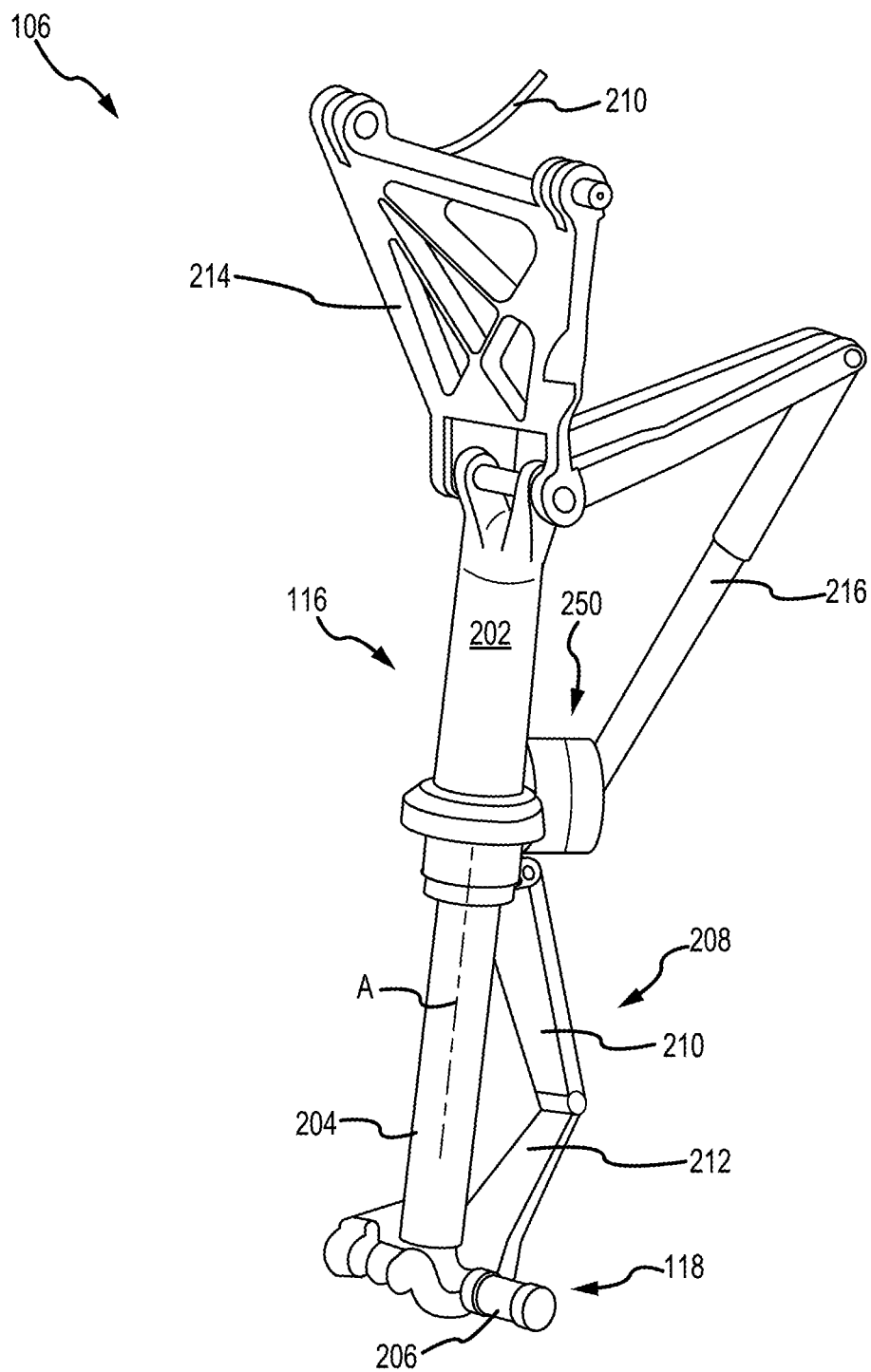
FIG. 2 illustrates a nose landing gear assembly, in accordance with various embodiments.

Referring now to FIG. 2, nose landing gear assembly 106 is illustrated. In accordance with various embodiments, the nose shock strut assembly 116 of nose landing gear assembly 106 includes a strut cylinder 202 and a strut piston 204. Strut piston 204 may be operatively coupled to strut cylinder 202. Strut cylinder 202 may be configured to receive strut piston 204 in a manner that allows the two components to telescope with respect to one another. Strut piston 204 may translate into and out the strut cylinder 202, thereby absorbing and damping loads imposed on nose landing gear assembly 106. An axle 206 of nose wheel assembly 118 may be coupled to an end of strut piston 204 that is opposite strut cylinder 202. The nose wheels have been removed from nose wheel assembly 118 in FIG. 2 to more clearly illustrate the features of the nose shock strut assembly 116.

In various embodiments, nose landing gear assembly 106 may include a torque link 208 coupled to the nose shock strut assembly 116 and/or to axle 206. Torque link 208 includes a first (or upper) arm 210 and a second (or lower) arm 212. First arm 210 is pivotably coupled to second arm 212. Strut cylinder 202 is coupled to an attachment linkage 214 configured to secure the nose shock strut assembly 116 to the aircraft 100 and to translate nose landing gear assembly 106 between the landing gear up and landing gear down positions. Nose landing gear assembly 106 may include one or more drag brace(s) such as drag brace 216. In various embodiments, drag brace 216 may be located proximate an aft side of the nose shock strut assembly 116. Nose landing gear assembly 106 may include one or more hydraulic fluid lines (i.e. conduits).

In accordance with various embodiments, nose landing gear assembly 106 includes a hydraulic motor 250. Hydraulic motor 250 is operably coupled to strut cylinder 202 via the nose shock strut assembly 116. In this regard, and as described in further detail below, hydraulic motor 250 is configured to rotate strut piston 204 about a piston axis of rotation A (also reference to as "axis A"), thereby adjusting the orientation of the nose wheel assembly 118 and the taxiing direction of the aircraft 100. Axis of rotation A may be parallel to the direction of translation of strut piston 204 relative to strut cylinder 202.

Figure 3A:
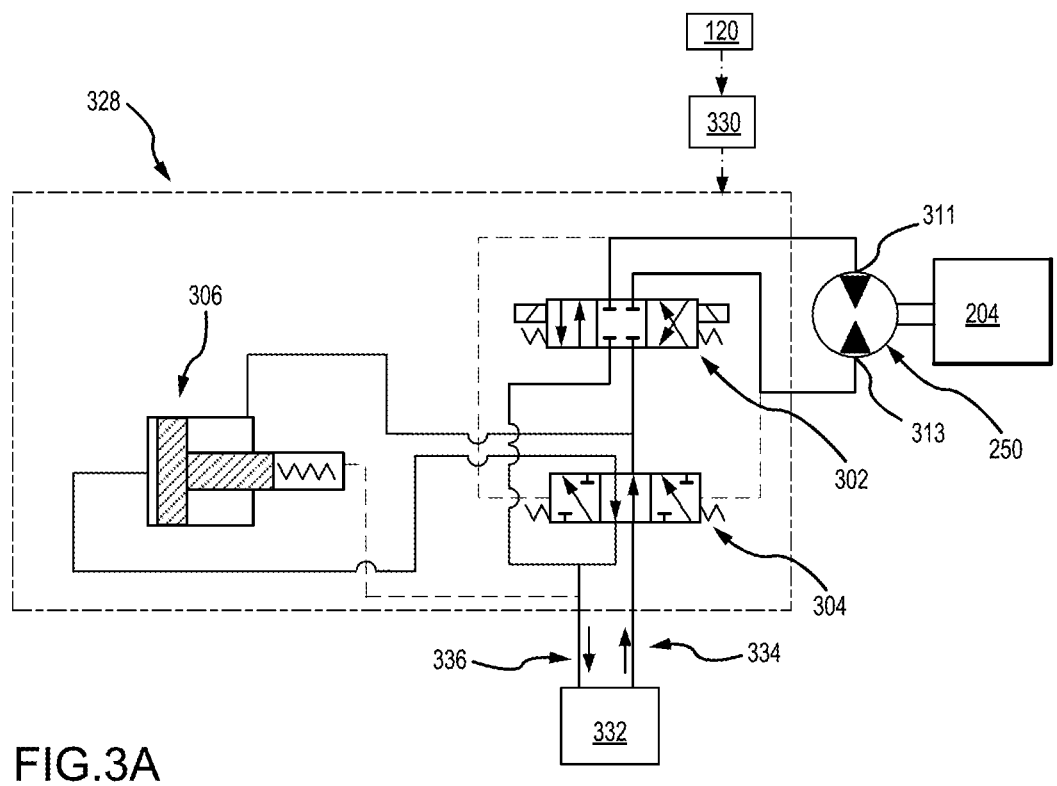
FIGS. 3A, 3B, 3C, 3D, and 3E illustrate a hydraulic motor start assist mechanism for use with a hydraulic motor for a nose-wheel steering system, in accordance with various embodiments.

Referring now to FIG. 3A, in various embodiments, a control valve assembly 328 coupled to the hydraulic motor 250 may include a solenoid-operated directional control (or servo) valve 302, an intensifier valve 304, and a displacement intensifier 306, among other valves or combination of valves suitable for controlling the flow volume and direction of flow to and from port 311 and port 313. Control valve assembly 328 is operably coupled to a steering controller 330. Actuation of control valve assembly 328 may be controlled via steering controller 330. Stated differently, steering controller 330 is configured to control the opening and closing (i.e., actuation) of control valve assembly 328, thereby controlling the flow of hydraulic fluid to and from each of port 311 and port 313. Steering controller 330 is operably coupled to pilot steering input 120. Steering controller 330 may send actuation commands to control valve assembly 328 based on signals received from pilot steering input 120.

Figure 3B:
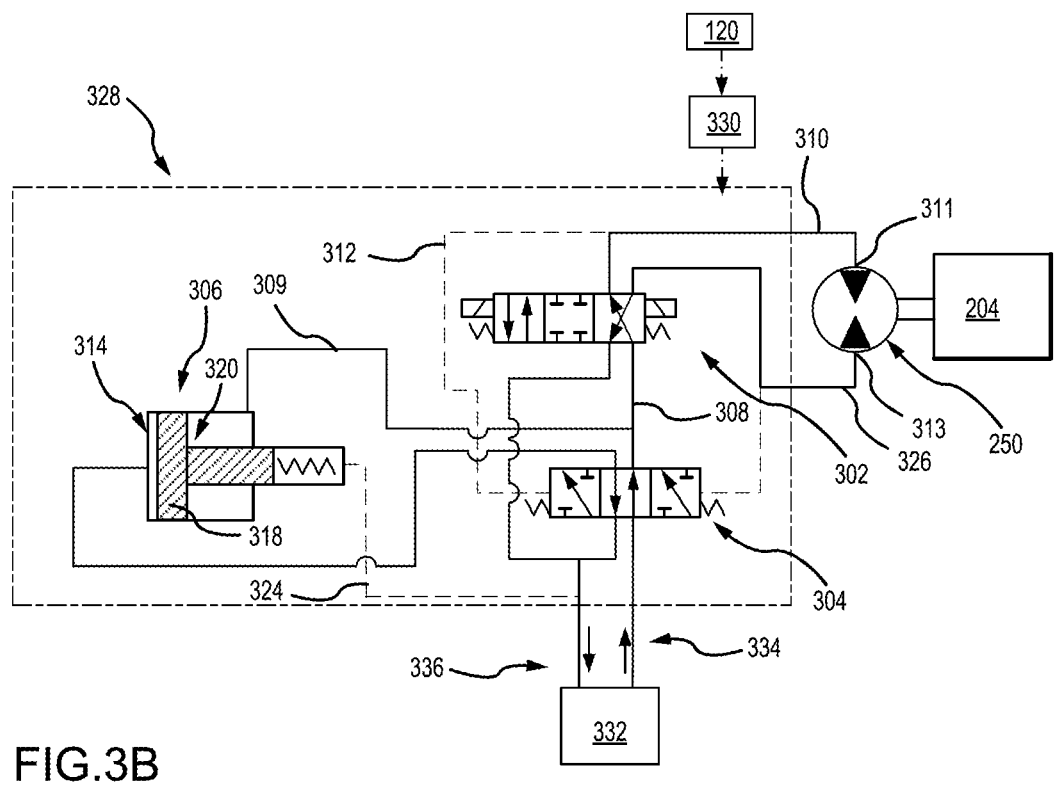

In various embodiments, in operation, and with additional reference to FIG. 3B, when a command is received from pilot steering input 120 via steering controller 330 to steer the nose landing gear assembly 106 to, for example, the right 20 degrees, 20 degrees per second, the command causes the solenoid-operated directional control (or servo) valve 302 to shift from a center flow-blocking position to a cross-flow position so that hydraulic fluid, flowing from the hydraulic fluid flow source 332 via third conduit 334, flows through intensifier valve 304 (in a center straight-flow position) to the solenoid-operated directional control (or servo) valve 302 via conduit 308. In that regard, the intensifier valve 304 is fluidly coupled to the hydraulic fluid flow source 332 via third conduit 334 and the intensifier valve 304 is fluidly coupled to the solenoid-operated directional control (or servo) valve 302 via conduit 308. It is noted that the hydraulic fluid also flows from intensifier valve 304 to a back-end side 320 of the displacement intensifier 306 via conduit 309 causing the piston 318 to translate in a first direction toward a head end 314 of the displacement intensifier 306 if not already bottomed on the head-end 314 of the displacement intensifier's 306 cylinder. In that regard, the intensifier valve 304 is fluidly coupled to the back-end side 320 of the displacement intensifier 306 via conduit 309.

Accordingly, in various embodiments, the hydraulic fluid then flows though solenoid-operated directional control (or servo) valve 302, which is the cross-flow position, to port 311 of the hydraulic motor 250 via conduit 310, the conduit 310 fluidly coupling the solenoid-operated directional control (or servo) valve 302 to port 311 of the hydraulic motor 250. In various embodiments, hydraulic fluid returning from port 313 of the hydraulic motor 250 flows to solenoid-operated directional control (or servo) valve 302 via conduit 326, which fluidly couples the port 313 of the hydraulic motor 250 to the solenoid-operated directional control (or servo) valve 302. The solenoid-operated directional control (or servo) valve 302, which is still in the cross-flow position, allows the hydraulic fluid to flow to the hydraulic fluid flow source 332 via fourth conduit 336, which fluidly couples the solenoid-operated directional control (or servo) valve 302 to the hydraulic fluid flow source 332.

Figure 3C:
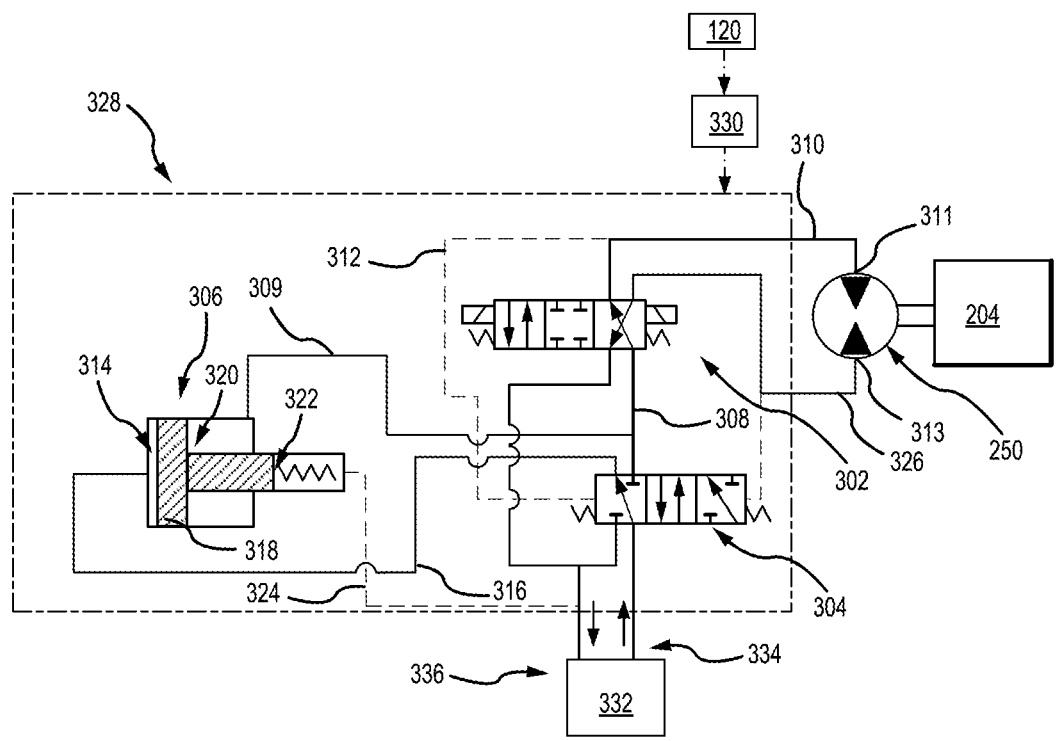

However, in various embodiments, the pressure of the hydraulic fluid, for example 2500 psi (172.3689 bar), delivered to the hydraulic motor 250 may not be enough to overcome a starting torque needed for the hydraulic motor 250 to rotate, for example 3500 psi (241.3165 bar). In various embodiments, in order to provide the necessary hydraulic fluid pressure to the hydraulic motor 250, displacement intensifier 306 is engaged. In various embodiments, the hydraulic fluid provided to the hydraulic motor 250 is also provided to the intensifier valve 304 via conduit 312, which is fluidly coupled to conduit 310. In that regard, the solenoid-operated directional control (or servo) valve 302 is fluidly coupled to the control of the intensifier valve 304 via conduit 312. In various embodiments, with reference to FIG. 3C, while the hydraulic fluid pressure is not enough to overcome the starting torque needed for the hydraulic motor 250 to rotate, the same hydraulic fluid pressure is enough to cause intensifier valve 304 to shift to the right, i.e. from a straight-flow position, which provides for hydraulic fluid to flow from the hydraulic fluid flow source 332 via third conduit 334 through intensifier valve 304 (in an displacement-flow position) to a head end side 314 of the displacement intensifier 306 via conduit 316. In that regard, the intensifier valve 304 (in a displacement-flow position) is fluidly coupled to the head-end side 314 of the displacement intensifier 306 via conduit 316.

In various embodiments, a force is generated to the head of piston 318 that is proportional to the area of the head of the piston 318 multiplied by the pressure of the hydraulic fluid. In various embodiments, the force that is generated to the head of piston 318 is reduced by the hydraulic fluid pressure at the tail end 322 of the piston 318, which is return pressure via conduit 324 tied to hydraulic fluid flow source 332 via fourth conduit 336, which, for example, may be at 50 psi (3.44738 bar). In that regard, the tail end 322 of the piston 318 is fluidly coupled to hydraulic fluid flow source 332 via fourth conduit 336.

Thus, in various embodiments, the higher hydraulic fluid pressure provided on the head end 314 of the piston 318 allows the piston 318 to translate in a second direction away from the head-end side 314 of the displacement intensifier 306 and increase the hydraulic fluid pressure to the hydraulic motor 250 via conduit 309, the solenoid-operated directional control (or servo) valve 302, and conduit 310. For example, if the hydraulic fluid pressure on the head-end side 314 of the piston 318 is 2500 psi (1723689 bar) and there is a 2-to-1 area ratio between the head-end side 314 of the piston 318 and the back-end side 320 of the piston 318, then a hydraulic fluid pressure of 5000 psi (3447379 bar) may be experienced on the back-end side 320 of the piston 318. In keeping with the example, the 5000 psi (3447379 bar) of hydraulic fluid pressure increases the hydraulic fluid pressure to the hydraulic motor 250 via conduit 309, the solenoid-operated directional control (or servo) valve 302, and conduit 310 thereby overcoming 3500 psi (241.3165 bar) starting torque needed for the hydraulic motor 250 to rotate.

In operation, once the hydraulic motor 250 starts to move, for example, below two RPMs, for example, one or two RPMs, the hydraulic fluid pressure required to steer the nose wheel assembly 118 will plummet because the torque efficiency suddenly increases by, for example, 15-20%. Thus, the hydraulic fluid pressure at the hydraulic motor 250 drops, which is also realized at the intensifier valve 304 via conduit 312, which causes the intensifier valve 304 to re-center, and with reference to FIG. 3B, allows the hydraulic fluid to flow to the hydraulic motor 250 as described previously with regard to FIG. 3B.

Figure 3D:
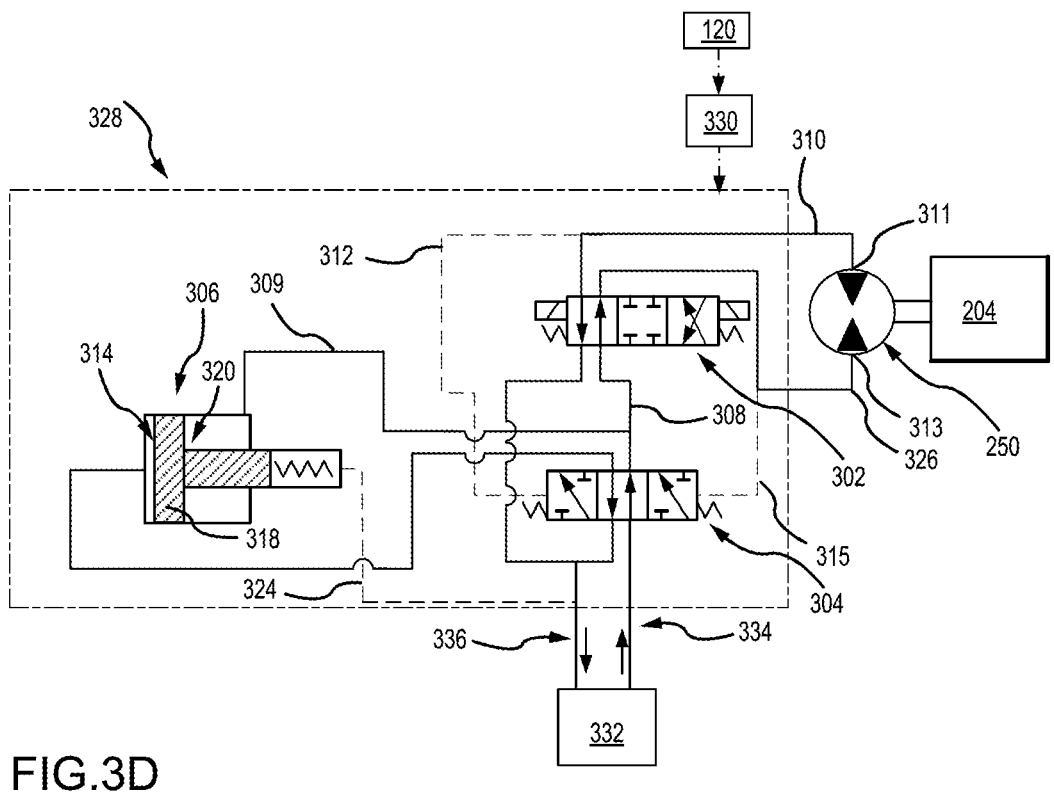

With additional reference to FIG. 3D, the process is reversed to enable turning the aircraft 100 in an opposite direction. In various embodiments, in operation, when a command is received from pilot steering input 120 via steering controller 330 to steer the nose landing gear assembly 106 to, for example, the left 20 degrees, 20 degrees per second, the command causes the solenoid-operated directional control (or servo) valve 302 to shift from a center flow-blocking position to a straight-flow position so that hydraulic fluid, flowing from the hydraulic fluid flow source 332 via third conduit 334, flows through intensifier valve 304 (in a center straight-flow position) to the solenoid-operated directional control (or servo) valve 302 via conduit 308. In that regard, the intensifier valve 304 is fluidly coupled to the hydraulic fluid flow source 332 via third conduit 334 and the intensifier valve 304 is fluidly coupled to the solenoid-operated directional control (or servo) valve 302 via conduit 308. It is noted that the hydraulic fluid also flows to a back-end side 320 of the displacement intensifier 306 via conduit 309 causing the piston 318 to translate in a first direction toward a head end 314 of the displacement intensifier 306 if not already bottomed on the head end 314 of the displacement intensifier's 306 cylinder. In that regard, the intensifier valve 304 is fluidly coupled to the back-end side 320 of the displacement intensifier 306 via conduit 309.

Accordingly, in various embodiments, the hydraulic fluid then flows though solenoid-operated directional control (or servo) valve 302, which is the straight-flow position, to port 313 of the hydraulic motor 250 via conduit 326, which fluidly couples the port 313 of the hydraulic motor 250 to the solenoid-operated directional control (or servo) valve 302. In various embodiments, hydraulic fluid returning from hydraulic motor 250 flows to solenoid-operated directional control (or servo) valve 302 via conduit 310, which fluidly couples the port 311 of the hydraulic motor 250 to the solenoid-operated directional control (or servo) valve 302. The solenoid-operated directional control (or servo) valve 302, which is in the straight-flow position, allows the hydraulic fluid to flow to the hydraulic fluid flow source 332 via fourth conduit 336, which fluidly couples the solenoid-operated directional control (or servo) valve 302 to the hydraulic fluid flow source 332.

Figure 3E:
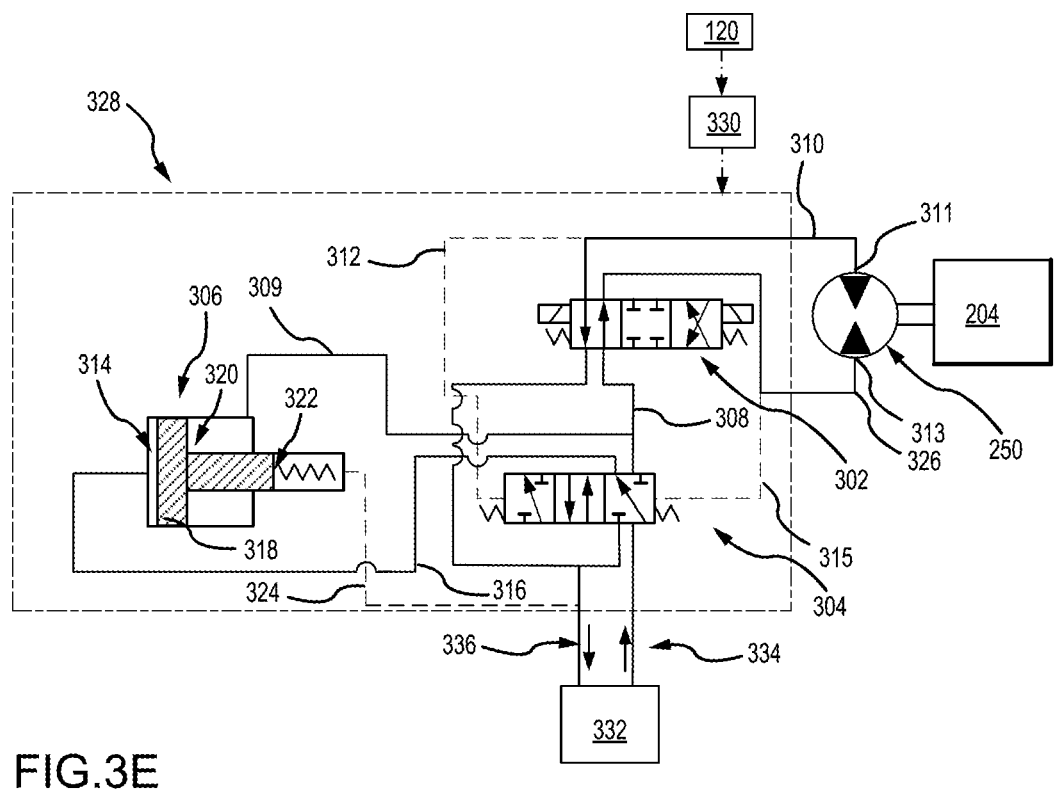

However, in various embodiments, the pressure of the hydraulic fluid, for example 2500 psi (172.3689 bar), delivered to the hydraulic motor 250 may not be enough to overcome a starting torque needed for the hydraulic motor 250 to rotate, for example 3500 psi (241.3165 bar). In various embodiments, in order to provide the necessary hydraulic fluid pressure to the hydraulic motor 250, displacement intensifier 306 is engaged. In various embodiments, the hydraulic fluid provided to the hydraulic motor 250 is also provided to the intensifier valve 304 via conduit 315, which is coupled to conduit 326. In that regard, the solenoid-operated directional control (or servo) valve 302 is fluidly coupled to the control of the intensifier valve 304 via conduit 315. In various embodiments, with reference to FIG. 3E, while the hydraulic fluid pressure is not enough to overcome the starting torque needed for the hydraulic motor 250 to rotate, the same hydraulic fluid pressure is enough to cause intensifier valve 304 to shift to the left, which provides for the hydraulic fluid flowing from the hydraulic fluid flow source 332 via third conduit 334 to flow through intensifier valve 304 (in a displacement-flow position) to a head-end side 314 of the displacement intensifier 306 via conduit 316. In that regard, the intensifier valve 304 (in a displacement-flow position) is fluidly coupled to the head-end side 314 of the displacement intensifier 306 via conduit 316.

In various embodiments, a force is generated to the head of piston 318 that is proportional to the area of the head of the piston times the pressure of the hydraulic fluid. In various embodiments, that force that is generated to the head of piston 318 is reduced by the hydraulic fluid pressure at the tail end 322 of the piston 318, which is return pressure via conduit 324 tied to hydraulic fluid flow source 332 via fourth conduit 336, which, for example, may be at 50 psi (3.44738 bar). In that regard, the tail end 322 of the piston 318 is fluidly coupled to hydraulic fluid flow source 332 via fourth conduit 336.

Thus, in various embodiments, the higher hydraulic fluid pressure provided on the head end 314 of the piston 318 allows the piston 318 to translate in a second direction away from the head-end side 314 of the displacement intensifier 306 and increase the hydraulic fluid pressure to the hydraulic motor 250 via conduit 309, the solenoid-operated directional control (or servo) valve 302, and conduit 326. For example, if the hydraulic fluid pressure on the head-end side 314 of the piston 318 is 2500 psi (172.3689 bar) and there is a 2-to-1 area ratio between the head-end side 314 of the piston 318 and the back-end side 320 of the piston 318, then a hydraulic fluid pressure of 5000 psi (344.7379 bar) may be experienced on the back-end side 320 of the piston 318. In keeping with the example, the 5000 psi (344.7379 bar) of hydraulic fluid pressure increases the hydraulic fluid pressure to the hydraulic motor 250 via conduit 309, the solenoid-operated directional control (or servo) valve 302, and conduit 326 thereby overcoming 3500 psi (241.3165 bar) starting torque needed for the hydraulic motor 250 to rotate.

In operation, once the hydraulic motor 250 starts to move, for example, one or two RPMs, the hydraulic fluid pressure required to steer the nose wheel assembly 118 will plummet because the torque efficiency suddenly jumps up by, for example, 15-20%. Thus, the hydraulic fluid pressure at the hydraulic motor 250 drops which is also realized at the intensifier valve 304 via conduit 315, which causes the intensifier valve 304 to re-center, and with reference to FIG. 3D, allows the hydraulic fluid to flow to the hydraulic motor 250 as described previously with regard to FIG. 3D.

Thus, in various embodiments, by providing a hydraulic motor start assist mechanism as described, the bi-directional hydraulic motor hydraulic motor may be sized approximately 20-30% smaller compared to what the bi-directional hydraulic motor hydraulic motor would normally be sized at without the hydraulic motor start assist mechanism. In various embodiments, the bi-directional hydraulic motor hydraulic motor weight savings of approximately 25% is reduced to approximately 15-20% by the added weight of the integral intensifier and intensifier valve of the hydraulic motor start assist mechanism.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nose-wheel steering system, comprising:
    a hydraulic motor including a drive shaft configured to rotate about a first axis; and
    a hydraulic motor start assist mechanism coupled to the hydraulic motor and configured to provide a temporary boost of hydraulic fluid pressure supplied to the hydraulic motor, wherein the hydraulic motor start assist mechanism comprises:
        a servo valve coupled to the hydraulic motor and an intensifier valve, the servo valve configured to provide the hydraulic fluid pressure to the hydraulic motor and the intensifier valve;
        the intensifier valve coupled to a displacement intensifier and configured to provide the hydraulic fluid pressure to the servo valve in a first state and provide the hydraulic fluid pressure to the displacement intensifier in a second state; and
        the displacement intensifier configured to translate in a first direction in the first state and translate in a second direction in the second state.

2. The nose-wheel steering system of claim 1, wherein:
    responsive to receiving a first command from a pilot steering input, the servo valve switches from a flow-blocking position to a cross-flow position,
    in the cross-flow position, the servo valve provides pressurized hydraulic fluid to a first port on the hydraulic motor, and
    responsive to the first command being discontinued, the servo valve switches from the cross-flow position to the flow-blocking position.

3. The nose-wheel steering system of claim 2, further comprising:
    responsive to the hydraulic fluid pressure at the first port on the hydraulic motor failing to overcome a starting torque of the hydraulic motor, a rise in the hydraulic fluid pressure causes the intensifier valve to switch from a straight-flow position to a displacement-flow position providing the pressurized hydraulic fluid to a head end of the displacement intensifier thereby causing the hydraulic fluid pressure at the first port on the hydraulic motor to increase to overcome the starting torque of the hydraulic motor.

4. The nose-wheel steering system of claim 3, wherein an area ratio between the head end of the displacement intensifier and a back end of the displacement intensifier provides for the increase in the hydraulic fluid pressure at the first port on the hydraulic motor when an area at the head end of the displacement intensifier is greater than an area at the back end of the displacement intensifier.

5. The nose-wheel steering system of claim 3, wherein the increase in the hydraulic fluid pressure provided by the displacement intensifier is caused by the area of the head end of the displacement intensifier being greater than an area at a tail end the displacement intensifier thereby allowing a piston in the displacement intensifier to translate in the first direction and cause the hydraulic fluid pressure at a back end of the displacement intensifier to increase in pressure.

6. The nose-wheel steering system of claim 1, wherein:
responsive to receiving a second command from a pilot steering input, the servo valve switches from a flow-blocking position to a straight-flow position,
in the straight-flow position, the servo valve provides pressurized hydraulic fluid to a second port on the hydraulic motor, and
responsive to the second command being discontinued, the servo valve switches from the straight-flow position to the flow-blocking position.

7. The nose-wheel steering system of claim 6, further comprising:
responsive to the hydraulic fluid pressure at the second port on the hydraulic motor failing to overcome a starting torque of the hydraulic motor, the hydraulic fluid pressure causes the intensifier valve to switch from a straight-flow position to a displacement-flow position providing the pressurized hydraulic fluid to a head end of the displacement intensifier thereby causing the hydraulic fluid pressure at the second port on the hydraulic motor to increase to overcome the starting torque of the hydraulic motor.

8. The nose-wheel steering system of claim 7, wherein an area ratio between the head end of the displacement intensifier and a back end of the displacement intensifier provides for the increase in the hydraulic fluid pressure at the second port on the hydraulic motor when an area at the head end of the displacement intensifier is greater than an area at the back end of the displacement intensifier.

9. The nose-wheel steering system of claim 7, wherein the increase in the hydraulic fluid pressure provided by the displacement intensifier is caused by the area at the head end of the displacement intensifier being greater than an area at a tail end of the displacement intensifier thereby allowing a piston in the displacement intensifier to translate in the first direction and cause the hydraulic fluid pressure at a back end of the displacement intensifier to increase in pressure.

10. A nose landing gear assembly, comprising:
a shock strut assembly including a strut cylinder and a strut piston configured to telescope relative to the strut cylinder; and
a nose-wheel steering system coupled to the shock strut assembly and configured to rotate the strut piston about a piston axis of rotation, the nose-wheel steering system comprising:
a hydraulic motor including a drive shaft configured to rotate about a second axis, the second axis being parallel to the piston axis of rotation; and
a hydraulic motor start assist mechanism coupled to the hydraulic motor and configured to provide a temporary boost of hydraulic fluid pressure supplied to the hydraulic motor, wherein the hydraulic motor start assist mechanism comprises:
a servo valve coupled to the hydraulic motor and an intensifier valve, the servo valve configured to provide the hydraulic fluid pressure to the hydraulic motor and the intensifier valve;
the intensifier valve coupled to a displacement intensifier and configured to provide the hydraulic fluid pressure to the servo valve in a first state and provide the hydraulic fluid pressure to the displacement intensifier in a second state; and
the displacement intensifier configured to translate in a first direction in the first state and translate in a second direction in the second state.

11. The nose landing gear assembly of claim 10, wherein:
responsive to receiving a first command from a pilot steering input, the servo valve switches from a flow-blocking position to a cross-flow position,
in the cross-flow position, the servo valve provides pressurized hydraulic fluid to a first port on the hydraulic motor, and
responsive to the first command being discontinued, the servo valve switches from the cross-flow position to the flow-blocking position.

12. The nose landing gear assembly of claim 11, further comprising:
responsive to the hydraulic fluid pressure at the first port on the hydraulic motor failing to overcome a starting torque of the hydraulic motor, a rise in the hydraulic fluid pressure causes the intensifier valve to switch from a straight-flow position to a displacement-flow position providing the pressurized hydraulic fluid to a head end of the displacement intensifier thereby causing the hydraulic fluid pressure at the first port on the hydraulic motor to increase to overcome the starting torque of the hydraulic motor.

13. The nose landing gear assembly of claim 12, wherein an area ratio between the head end of the displacement intensifier and a back end of the displacement intensifier provides for the increase in the hydraulic fluid pressure at the first port on the hydraulic motor when an area at the head end of the displacement intensifier is greater than an area at the back end of the displacement intensifier, and wherein the increase in the hydraulic fluid pressure provided by the displacement intensifier is caused by the area at the head end of the displacement intensifier being greater than an area at a tail end of the displacement intensifier thereby allowing a piston in the displacement intensifier to translate in the first direction and cause the hydraulic fluid pressure at the back end of the displacement intensifier to increase in pressure.

14. The nose landing gear assembly of claim 10, wherein:
responsive to receiving a second command from a pilot steering input, the servo valve switches from a flow-blocking position to a straight-flow position,
in the straight-flow position, the servo valve provides pressurized hydraulic fluid to a second port on the hydraulic motor, and responsive to the second command being discontinued, the servo valve switches from the straight-flow position to the flow-blocking position.

15. The nose landing gear assembly of claim 14, further comprising:
responsive to the hydraulic fluid pressure at the second port on the hydraulic motor failing to overcome a starting torque of the hydraulic motor, the hydraulic fluid pressure causes the intensifier valve to switch from a straight-flow position to a displacement-flow position providing the pressurized hydraulic fluid to a head end of the displacement intensifier thereby causing the hydraulic fluid pressure at the second port on the hydraulic motor to increase to overcome the starting torque of the hydraulic motor.

16. The nose landing gear assembly of claim 15, wherein an area ratio between the head end of the displacement intensifier and a back end of the displacement intensifier provides for the increase in the hydraulic fluid pressure at the second port on the hydraulic motor when an area at the head end of the displacement intensifier is greater than an area at the back end of the displacement intensifier, and wherein the increase in the hydraulic fluid pressure provided by the displacement intensifier is caused by the area at the head end of the displacement intensifier being greater than an area at a tail end of the displacement intensifier thereby allowing a piston in the displacement intensifier to translate in the first direction and cause the hydraulic fluid pressure at the back end of the displacement intensifier to increase in pressure.

17. A shock strut assembly for an aircraft landing gear assembly, comprising:
a strut cylinder;
a strut piston configured to telescope relative to the strut cylinder; and
a steering system coupled to the strut piston and configured to rotate the strut piston about a piston axis of rotation, the steering system comprising:
a hydraulic motor including a drive shaft configured to rotate about a second axis, the second axis being parallel to the piston axis of rotation; and
a hydraulic motor start assist mechanism coupled to the hydraulic motor and configured to provide a temporary boost of hydraulic fluid pressure supplied to the hydraulic motor, wherein the hydraulic motor start assist mechanism comprises:
a servo valve coupled to the hydraulic motor and an intensifier valve, the servo valve configured to provide the hydraulic fluid pressure to the hydraulic motor and the intensifier valve;
the intensifier valve coupled to a displacement intensifier and configured to provide the hydraulic fluid pressure to the servo valve in a first state and provide the hydraulic fluid pressure to the displacement intensifier in a second state; and
the displacement intensifier configured to translate in a first direction in the first state and translate in a second direction in the second state.

* * * * *